US011034382B2

United States Patent
Tsubaki et al.

(10) Patent No.: US 11,034,382 B2
(45) Date of Patent: Jun. 15, 2021

(54) STEERING APPARATUS FOR VEHICLES

(71) Applicant: NSK LTD., Tokyo (JP)

(72) Inventors: Takahiro Tsubaki, Maebashi (JP); Yousuke Imamura, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/638,622

(22) PCT Filed: Oct. 22, 2018

(86) PCT No.: PCT/JP2018/039148
§ 371 (c)(1),
(2) Date: Feb. 12, 2020

(87) PCT Pub. No.: WO2019/082835
PCT Pub. Date: May 2, 2019

(65) Prior Publication Data
US 2020/0369316 A1 Nov. 26, 2020

(30) Foreign Application Priority Data
Oct. 24, 2017 (JP) .............................. JP2017-204910

(51) Int. Cl.
*B62D 5/04* (2006.01)
*B62D 6/02* (2006.01)

(52) U.S. Cl.
CPC ......... *B62D 5/0463* (2013.01); *B62D 5/0472* (2013.01); *B62D 5/0493* (2013.01); *B62D 6/02* (2013.01)

(58) Field of Classification Search
CPC .... B62D 5/0463; B62D 6/008; B62D 15/021; B62D 5/0409; B62D 6/002; B62D 5/0493; B62D 6/02
See application file for complete search history.

(56) References Cited

U.S. PATENT DOCUMENTS

| 2013/0261894 A1 | 10/2013 | Kojima |
| 2017/0217479 A1 | 8/2017 | Tsubaki |
| 2017/0232997 A1 | 8/2017 | Tsubaki et al. |

FOREIGN PATENT DOCUMENTS

| CN | 102712340 A | 10/2012 |
| CN | 106573647 A | 4/2017 |

(Continued)

OTHER PUBLICATIONS

International Search Report for PCT/JP2018/039148, dated Dec. 18, 2018.

(Continued)

*Primary Examiner* — Redhwan K Mawari
(74) *Attorney, Agent, or Firm* — Sughrue Mion, PLLC

(57) ABSTRACT

A steering apparatus for vehicles that easily obtains equivalent steering torques to vehicle driving information such as a steering angle without being affected by a road surface state and aging-changes of mechanism characteristics of a steering system. The steering apparatus includes a torsional angle control section that calculates a motor current command value based on a target torsional angle corresponding to vehicle driving information and the torsional angle, and includes a torsional angle feedback compensating section that calculates a target torsional angular velocity by a deviation between the target torsional angle and the torsional angle. A torsional angular velocity calculating section calculates a torsional angular velocity by the torsional angle, and a velocity control section calculates a pre-limitation motor current command value by performing proportional compensation based on the target torsional angular velocity and the torsional angular velocity. An output limiting section limits upper and lower limit values of the pre-limitation motor current command value, and outputs the motor current command value which is used to control the motor.

18 Claims, 16 Drawing Sheets

(56) References Cited

FOREIGN PATENT DOCUMENTS

| | | |
|---|---|---|
| CN | 107531275 A | 1/2018 |
| EP | 2 572 964 A1 | 3/2013 |
| EP | 3 184 402 A1 | 6/2017 |
| EP | 3 184 403 A1 | 6/2017 |
| JP | 9-156526 A | 6/1997 |
| JP | 2003-237607 A | 8/2003 |
| JP | 5208894 B2 | 6/2013 |
| JP | 2014-213781 A | 11/2014 |
| JP | 2015-199415 A | 11/2015 |
| JP | 2016-088311 A | 5/2016 |
| JP | 2006-175940 A | 7/2016 |
| WO | 2012/066704 A1 | 5/2012 |
| WO | 2016/027663 A1 | 2/2016 |
| WO | 2016/072143 A1 | 5/2016 |

OTHER PUBLICATIONS

International Preliminary Report on Patentability for PCT/JP2018/039148, dated Sep. 4, 2019.

PRIOR ART

STEERING APPARATUS FOR VEHICLES

CROSS REFERENCE TO RELATED APPLICATIONS

This application is a National Stage of International Application No. PCT/JP2018/039148 filed Oct. 22, 2018, claiming priority based on Japanese Patent Application No. 2017-204910 filed Oct. 24, 2017.

TECHNICAL FIELD

The present invention relates to a high-performance steering apparatus for vehicles that obtains a desired steering torque by performing control so that a torsional angle of a torsion bar or the like follows a value corresponding to vehicle driving information, and maintains the desired steering torque without being affected by a road surface state and aging-changes of mechanism system characteristics.

BACKGROUND ART

An electric power steering apparatus (EPS) being one of steering apparatuses for vehicles provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through a reduction mechanism 3, universal joints 4a and 4b, a rack-and-pinion mechanism 5, and tie rods 6a and 6b, further via hub units 7a and 7b. In addition, a torque sensor 10 for detecting a steering torque Ts of the steering wheel 1 and a steering angle sensor 14 for detecting a steering angle θh are provided in the column shaft 2 having a torsion bar, and a motor 20 for assisting a steering force of the steering wheel 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Ts detected by the torque sensor 10 and a vehicle speed Vs detected by a vehicle speed sensor 12, and controls a current supplied to the motor 20 for the EPS by means of a voltage control command value Vref obtained by performing compensation or the like to the current command value.

A controller area network (CAN) 40 exchanging various information of a vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31. The current command value calculating section 31 calculates a current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current Im of the motor 20 is detected by a motor current detector 38 and is fed back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds a convergence 341 to the added result at an adding section 345, and then outputs the added result at the adding section 345 as the compensation signal CM.

Thus, in assist control by a conventional electric power steering apparatus, a steering torque applied by a manual input of a driver is detected as a torsional torque of a torsion bar by a torque sensor, and a motor current is mainly controlled as an assist current depending on the detected steering torque. However, in the case of performing control by this method, different steering torques can be generated depending on a steering angle due to a difference of a road surface state (for example, a cant of the road surface). Variations of a motor output characteristic due to long-term use can also affect the steering torque.

In order to solve the above problems, for example, an electric power steering apparatus shown in the publication of Japanese Patent No. 5208894 B2 (Patent Document 1) has been proposed. The electric power steering apparatus of Patent Document 1 sets a target value of the steering torque based on a relation (a steering reaction characteristic map) between the steering angle, which is determined based on a relation between the steering angle or the steering torque and an amount of response, and the steering torque in order to apply an appropriate steering torque based on a tactile characteristic of a driver.

THE LIST OF PRIOR ART DOCUMENTS

Patent Documents

Patent Document 1: Japanese Patent No. 5208894 B2

SUMMARY OF THE INVENTION

Problems to be Solved by the Invention

However, in the electric power steering apparatus of Patent Document 1, it is necessary to obtain the steering reaction characteristic map preliminarily. Further, since the apparatus performs control based on a deviation between a target value of the steering torque and a detected steering torque, an influence to the steering torque may remain.

The present invention has been developed in view of the above-described circumstances, and an object of the present invention is to provide a steering apparatus for vehicles that easily obtains equivalent steering torques to vehicle driving information such as a steering angle without being affected by a road surface state and aging-changes of mechanism characteristics of a steering system.

Means for Solving the Problems

The present invention relates to a steering apparatus for vehicles that comprises at least a torsion bar having an arbitrary spring constant and a sensor detecting a torsional angle, drives and controls a motor, and assists and controls a steering system, the above-described object of the present invention is achieved by that comprising: a torsional angle control section that calculates a motor current command value based on a target torsional angle corresponding to vehicle driving information and the torsional angle; wherein the torsional angle control section comprises a torsional angle feedback compensating section that calculates a target torsional angular velocity by a deviation between the target torsional angle and the torsional angle, a torsional angular velocity calculating section that calculates a torsional angular velocity by the torsional angle, a velocity control section that calculates a pre-limitation motor current command value by performing proportional compensation based on the target torsional angular velocity and the torsional angular velocity, and an output limiting section that limits upper and lower limit values of the pre-limitation motor current command value, and outputs the motor current command value; and wherein the steering apparatus for vehicles drives and controls the motor based on the motor current command value.

Alternatively, the above-described object of the present invention is achieved by that comprising: a torsional angle control section that calculates a motor current command value based on a target torsional angle corresponding to vehicle driving information, the torsional angle, a first rotation angle and a second rotation angle; wherein the torsional angle control section comprises a torsional angle feedback compensating section that calculates a target torsional angular velocity by a deviation between the target torsional angle and the torsional angle, a first angular velocity calculating section that calculates a first angular velocity by the first rotation angle, a second angular velocity calculating section that calculates a second angular velocity by the second rotation angle, a velocity control section that calculates a pre-limitation motor current command value by performing proportional compensation based on a target angular velocity that is obtained by the target torsional angular velocity and the first angular velocity, and the second angular velocity, and an output limiting section that limits upper and lower limit values of the pre-limitation motor current command value, and outputs the motor current command value; and wherein the steering apparatus for vehicles drives and controls the motor based on the motor current command value.

Alternatively, the above-described object of the present invention is achieved by that comprising: a torsional angle control section that calculates a motor current command value based on a target torsional angle corresponding to vehicle driving information, a first rotation angle and a second rotation angle; wherein the torsional angle control section comprises a torsional angle feedback compensating section that calculates a target torsional angular velocity by a deviation between a target rotation angle that is obtained by the target torsional angle and the first rotation angle and the second rotation angle, a first angular velocity calculating section that calculates a first angular velocity by the first rotation angle, a second angular velocity calculating section that calculates a second angular velocity by the second rotation angle, a velocity control section that calculates a pre-limitation motor current command value by performing proportional compensation based on a target angular velocity that is obtained by the target torsional angular velocity and the first angular velocity, and the second angular velocity, and an output limiting section that limits upper and lower limit values of the pre-limitation motor current command value, and outputs the motor current command value; and wherein the steering apparatus for vehicles drives and controls the motor based on the motor current command value.

Further, the above-described object of the present invention is efficiently achieved by that wherein the torsional angle control section further comprises an input limiting section that limits upper and lower limit values of the target torsional angle; or wherein the torsional angle control section further comprises a rate limiting section that limits a change amount of the target torsional angle; or further comprising: a target steering torque generating section that generates a target steering torque based on the vehicle driving information, and a converting section that converts the target steering torque into the target torsional angle used at the torsional angle control section; or wherein the target steering torque generating section comprises a basic map section that obtains a first torque signal in accordance with the vehicle driving information by using a basic map being vehicle speed sensitive, a damper calculating section that obtains a second torque signal based on angular velocity information by using a damper gain map being vehicle speed sensitive, and a hysteresis correcting section that obtains a third torque signal by performing hysteresis correction to the vehicle driving information depending on a steering state, and calculates the target steering torque by the first torque signal, the second torque signal and the third torque signal; or wherein the steering apparatus for vehicles drives and controls the motor based on a current command value that is obtained by adding an assist current command value calculated based on a steering torque to the motor current command value.

Effects of the Invention

By performing velocity control using proportional compensation to the target torsional angular velocity or the target angular velocity which is calculated based on the target torsional angle corresponding to the vehicle driving information, the steering apparatus for vehicles of the present invention operates so that the torsional angle follows the target torsional angle, obtains a desired steering torque to the vehicle driving information, and can supply an appropriate steering torque based on steering feeling of a driver. The torsional angle control section comprises the velocity control section that controls the torsional angular velocity or the angular velocity, thereby, followability to the target torsional angle can be improved, an influence to the torsional angle due to a change of a steering angle inputted from a driver can be suppressed, and followability of the torsional angle to the target torsional angle against abrupt steering can be improved.

MODE FOR CARRYING OUT THE INVENTION

The present invention is a steering apparatus for vehicles to obtain an equivalent steering torque corresponding to vehicle driving information such as a steering angle, a vehicle speed and a steering state without being affecting a road surface state, and obtains a desired steering torque by performing control so that a torsional angle of a torsion bar or the like follows a value depending on the vehicle driving information.

Hereinafter, embodiments of the present invention will be described with reference to the accompanying drawings.

Figure 3:
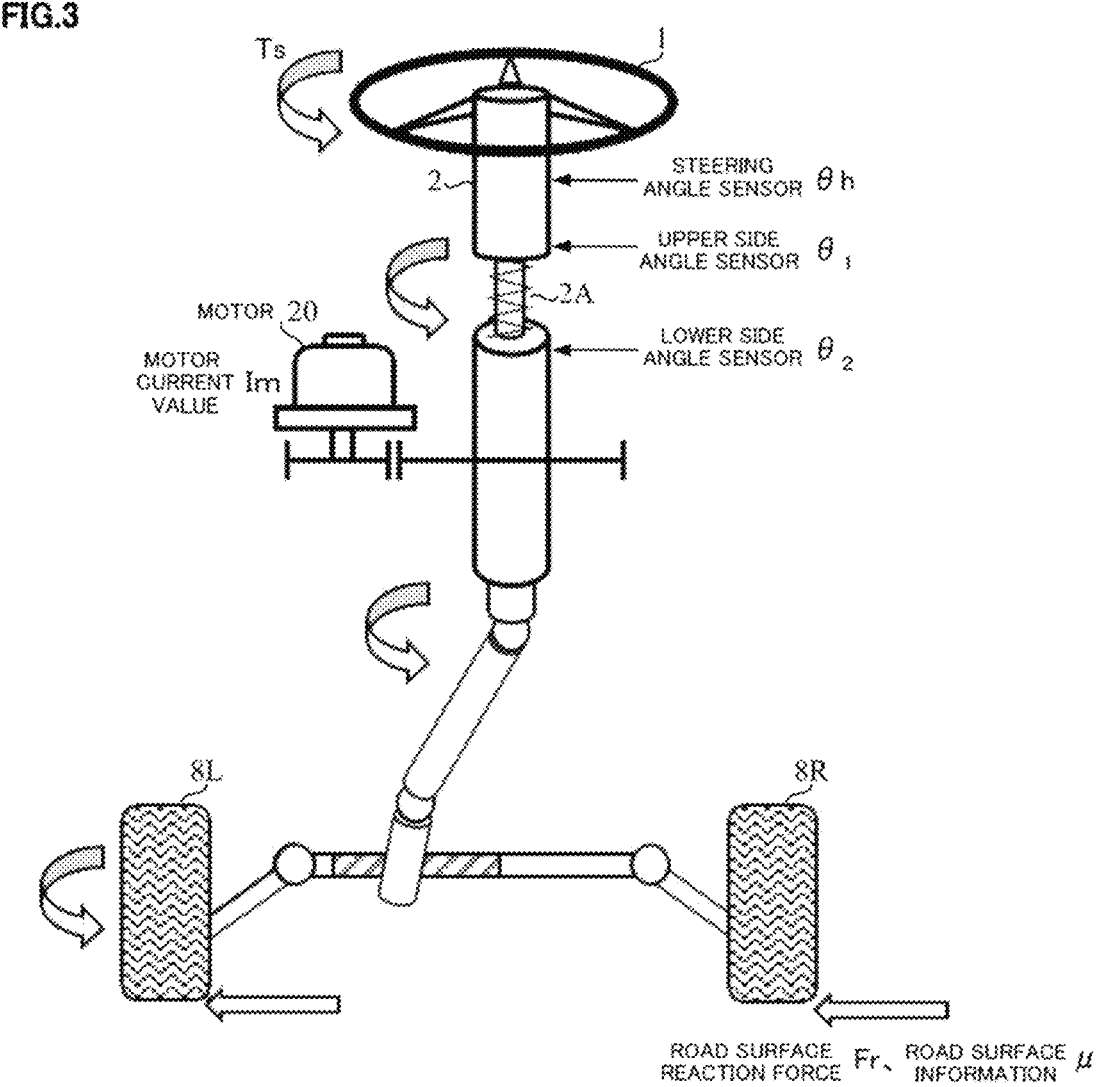
FIG. 3 is a structural diagram showing an installation example of an EPS steering system and various sensors.

First, an installation example of various sensors that detect information related to an electric power steering apparatus being one of steering apparatuses for vehicle of the present invention, will be described. FIG. 3 is a diagram showing an installation example of an EPS steering system and various sensors. A torsion bar 2A is provided in a column shaft 2. Road surface reaction force Fr and road surface information p operate on steered wheels 8L and 8R. An upper side angle sensor is disposed on a steering wheel side of the column shaft 2 above the torsion bar 2A, and a lower side angle sensor is disposed on a steered wheel side of the column shaft 2 below the torsion bar 2A. The upper side angle sensor detects a steering wheel angle $\theta_1$, and the lower side angle sensor detects a column angle $\theta_2$. A steering angle θh is detected by a steering angle sensor disposed on an upper portion of the column shaft 2. A torsional angle Δθ of the torsion bar and a torsion bar torque Tt can be calculated by the following expressions 1 and 2 from a deviation between the steering wheel angle $\theta_1$ and the column angle $\theta_2$. In the expression 2, Kt is a spring constant of the torsion bar 2A.

$$\theta_2 - \Theta_1 = \Delta\theta \quad \text{[Expression 1]}$$

$$Kt \cdot \Delta\theta = Kt \cdot (\theta_2 - \theta_1) = Tt \quad \text{[Expression 2]}$$

The torsion bar torque Tt can be also detected by using, for example, a torque sensor disclosed in Japanese Unexamined Patent Publication No. 2008-216172 A.

Next, a configuration example of the present invention will be described.

Figure 4:
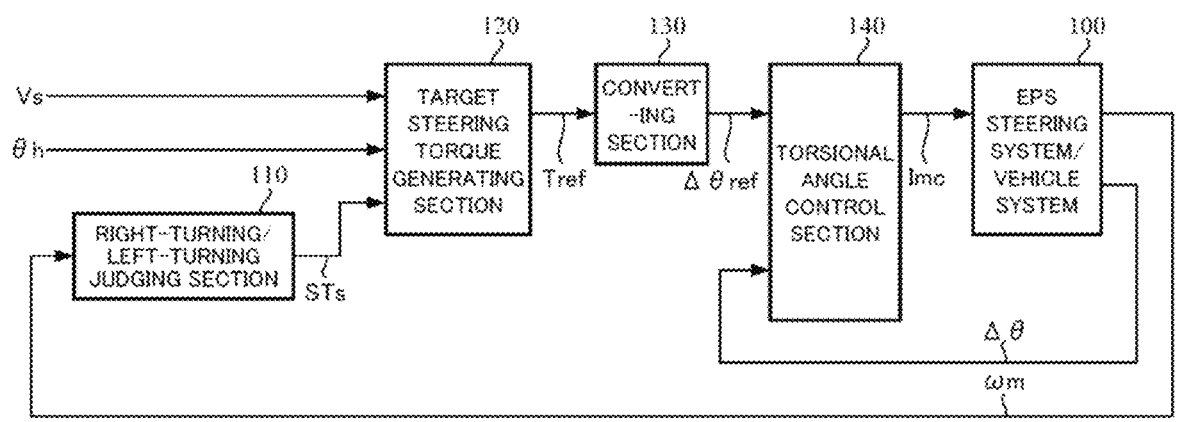
FIG. 4 is a block diagram showing a configuration example (a first embodiment) of the present invention.

FIG. 4 is a block diagram showing a configuration example (a first embodiment) of the present invention, and steering of a driver is assisted and controlled by a motor in an EPS steering system/vehicle system 100. A vehicle speed Vs being the vehicle driving information and a steering state STs that is outputted from a right-turning/left-turning judging section 110 and indicates right-turning or left-turning, are inputted into a target steering torque generating section 120 that outputs a target steering torque Tref corresponding to the steering angle θh being the vehicle driving information, in addition to the steering angle θh. The target steering torque Tref is converted into a target torsional angle Δθref at a converting section 130, and the target torsional angle Δθref is inputted into a torsional angle control section 140 with the torsional angle Δθ of the torsion bar 2A. The torsional angle control section 140 calculates a motor current command value Imc so that the torsional angle Δθ becomes the target torsional angle Δθref. The motor of the EPS is driven in accordance with the motor current command value Imc.

The right-turning/left-turning judging section 110 judges whether steering is right-turning or left-turning based on a motor angular velocity ωm, and outputs the judgment result as the steering state STs. That is, when the motor angular velocity ωm is a positive value, the right-turning/left-turning judging section 110 judges the steering "right-turning", and when the motor angular velocity ωm is a negative value, the right-turning/left-turning judging section 110 judges the steering "left-turning". Instead of the motor angular velocity ωm, an angular velocity calculated by velocity calculation with respect to the steering angle θh, the steering wheel angle θ₁ or the column angle θ₂, may be used.

Figure 5:
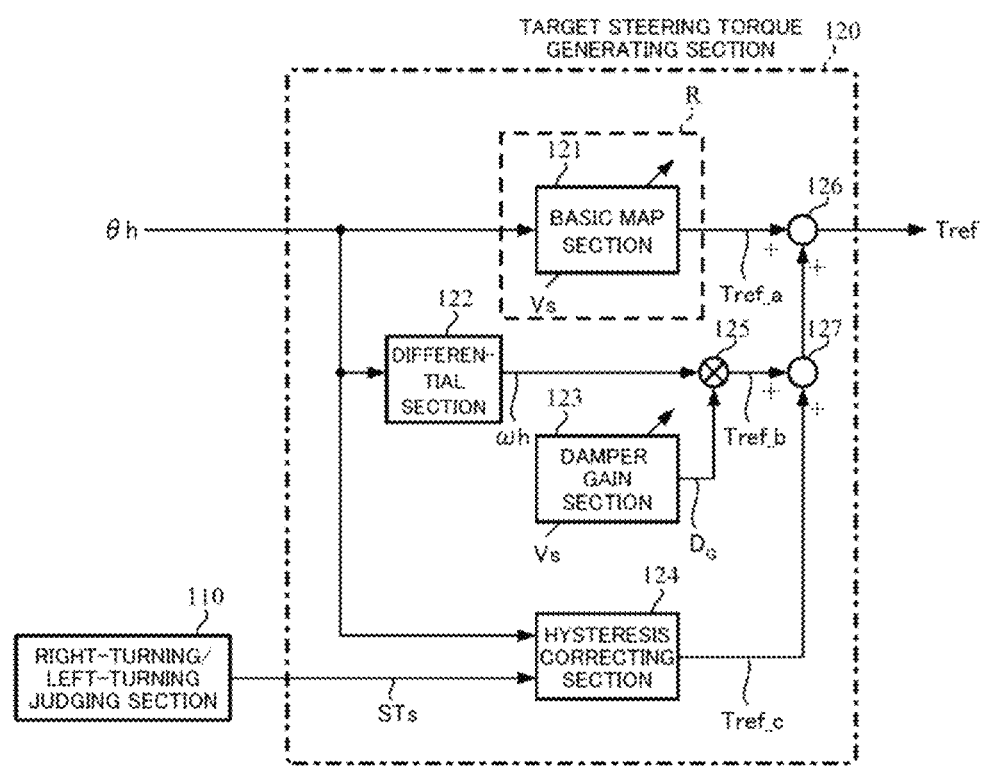
FIG. 5 is a block diagram showing a configuration example of a target steering torque generating section.

FIG. 5 shows a configuration example of the target steering torque generating section 120. The target steering torque generating section 120 comprises a basic map section 121, a differential section 122, a damper gain section 123, a hysteresis correcting section 124, a multiplying section 125 and adding sections 126 and 127. The steering angle θh is inputted into the basic map section 121, the differential section 122 and the hysteresis correcting section 124. The steering state STs outputted from the right-turning/left-turning judging section 110 is inputted into the hysteresis correcting section 124.

Figure 6A:
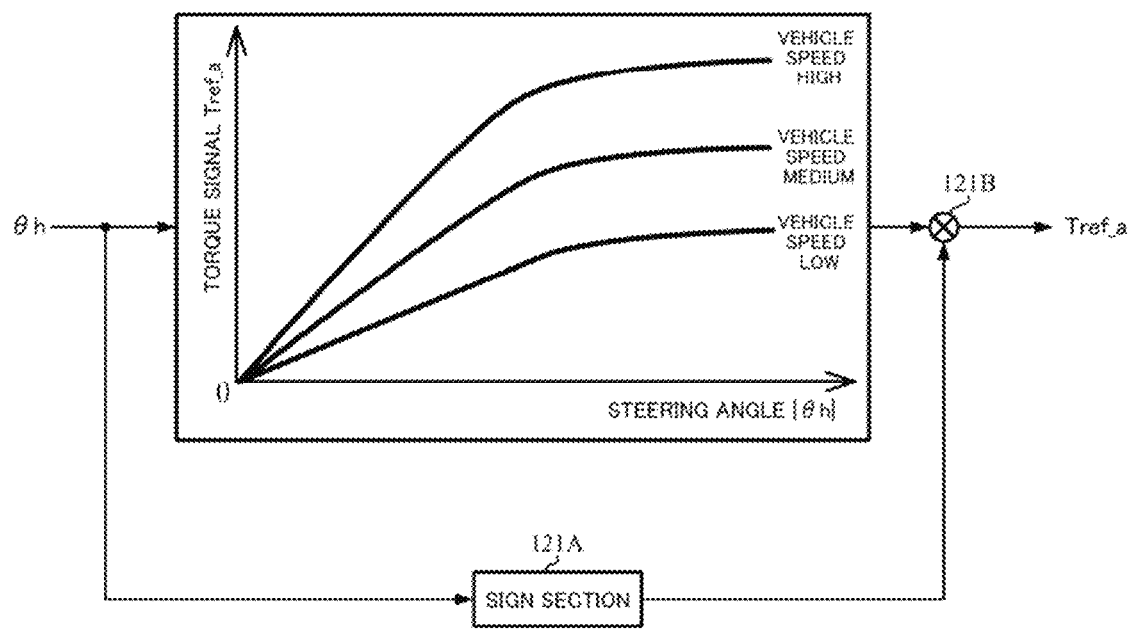
FIGS. 6A and 6B are diagrams showing a characteristic example of a basic map.
Figure 6B:
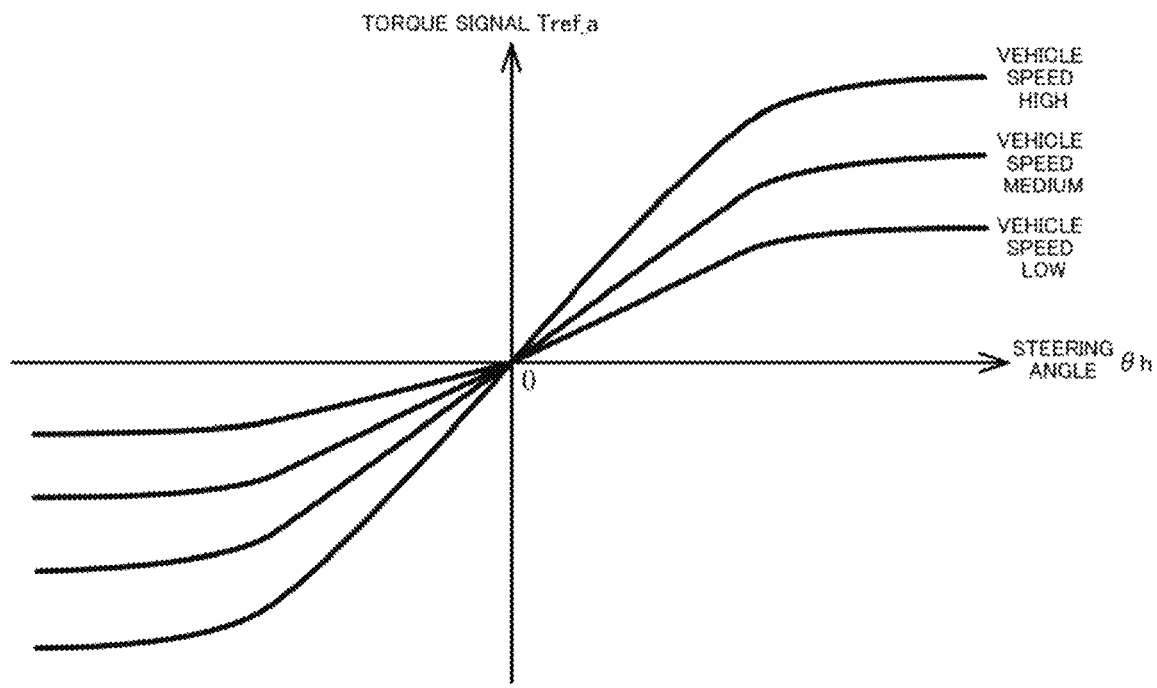

The basic map section 121 has a basic map, and outputs a torque signal (a first torque signal) Tref_a having the vehicle speed Vs as a parameter by using the basic map. The basic map has been adjusted by tuning. For example, as shown in FIG. 6A, the torque signal Tref_a increases as a magnitude (an absolute value) |θh| of the steering angle θh increases, and increases also as the vehicle speed Vs increases. FIG. 6A shows a configuration where a sign section 121A outputs a sign (+1, −1) of the steering angle θh to a multiplying section 121B, a magnitude of the torque signal Tref_a is obtained from the magnitude of the steering angle θh by using a map, the magnitude of the torque signal Tref_a is multiplied by the sign of the steering angle θh, and the torque signal Tref_a is obtained. On the other hand, as shown in FIG. 6B, the map may be configured depending on a positive and a negative steering angles θh. In this case, the mode of variation may be changed depending on whether the steering angle θh is positive or negative.

The differential section 122 calculates a steering angular velocity ωh by differentiating the steering angle θh, and the steering angular velocity ωh is inputted into the multiplying section 125.

Figure 7:
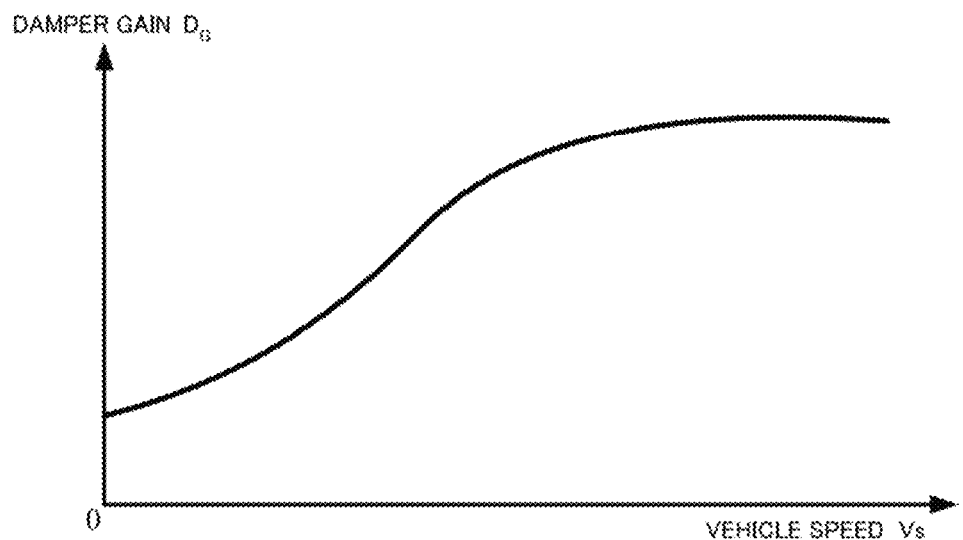
FIG. 7 is a diagram showing a characteristic example of a damper gain map.

The damper gain section 123 outputs a damper gain $D_G$ by which the steering angular velocity ωh is multiplied. The steering angular velocity ωh that is multiplied by the damper gain $D_G$ at the multiplying section 125, is inputted into the adding section 127 as a torque signal (a second torque signal) Tref_b. The damper gain $D_G$ is obtained depending on the vehicle speed Vs by using a vehicle speed sensitive damper gain map that the damper gain section 123 has. The damper gain map, for example, as shown in FIG. 7, has a characteristic that the damper gain $D_G$ increases gradually as the vehicle speed Vs increases. The damper gain map may be variable depending on the steering angle θh. The damper gain section 123 and the multiplying section 125 constitute a damper calculating section.

The hysteresis correcting section 124 calculates a torque signal (a third torque signal) Tref_c based on the steering angle θh and the steering state STs in accordance with the following expression 3. In the following expression 3, x and y are set to θh and Tref_c respectively (x=θh and y=Tref_c), and $A_{hys}$ is a hysteresis width.

when right-turning $y=A_{hys}[1-\exp\{-a(x-b)\}]$ when left-turning $y=-A_{hys}[1-\exp\{a(x-b)\}]$ [Expression 3]

Figure 8:
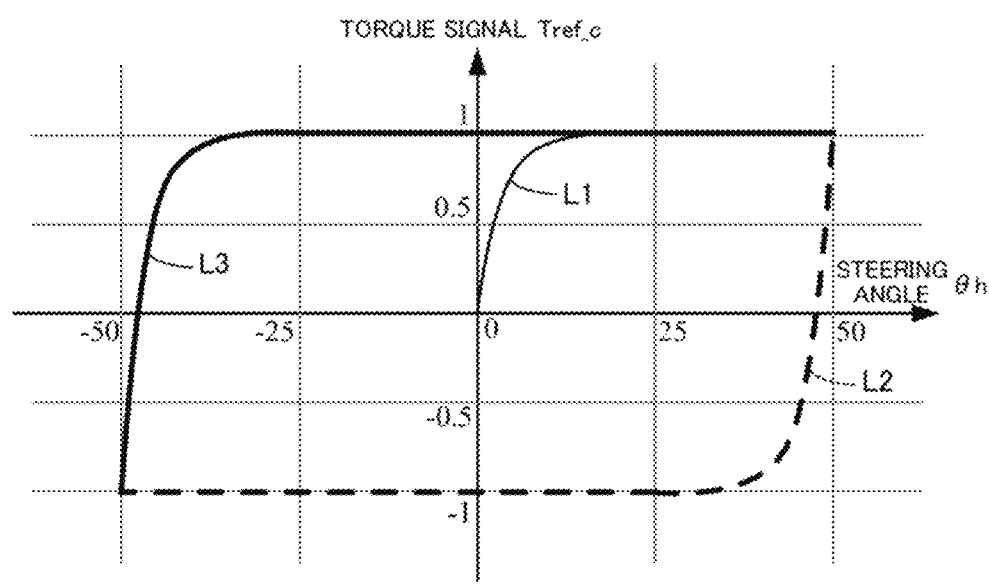
FIG. 8 is a diagram showing a characteristic example of a hysteresis correcting section.

When switching from the right-turning steering to the left-turning steering and when switching from the left-turning steering to the right-turning steering, based on the final coordinates (x1, y1), a value "b" of the following expression 4 is substituted into the value "b" in the expression 3 after switching. Thereby, continuity when switching the steering is maintained.

when right-turning $b = x_1 + \frac{1}{a}\log_e\left(1 - \frac{y_1}{A_{hys}}\right)$ [Expression 4]

when left-turning $b = x_1 - \frac{1}{a}\log_e\left(1 + \frac{y_1}{A_{hys}}\right)$ Setting $A_{hys}$=1 [Nm] and a=0.3 in the expressions 3 and 4, in the case that an initial angle of the steering wheel is 0 [deg] and the steering wheel is steered between +50 [deg] and −50 [deg], a changing example of the torque signal Tref_c which hysteresis correction is applied to is shown in FIG. 8. That is, the torque signal Tref_c from the hysteresis correcting section 124 has a hysteresis characteristic shown by "an origin point→L1 (the thin line)→L2 (the broken line)→L3 (the thick line)".

$A_{hys}$ which is a coefficient expressing an output width of the hysteresis characteristic, and "a" which is a coefficient expressing roundness, may be variable depending on the vehicle speed Vs and/or the steering angle θh.

The torque signals Tref_a, Tref_b and Tref_c are added at the adding sections 126 and 127, and the added result is outputted as the target steering torque Tref.

The steering angular velocity ωh is obtained by differential calculation to the steering angle θh, and low pass filter (LPF) processing is appropriately performed in order to reduce an affection of a noise in a high frequency band. The differential calculation and the LPF processing may be performed by using a high pass filter (HPF) and a gain. The steering angular velocity ωh may be calculated by the differential calculation and the LPF processing to the steering wheel angle θ₁ detected by the upper side angle sensor or the column angle θ₂ detected by the lower side angle sensor, instead of the steering angle θh. The motor angular velocity ωm may be used instead of the steering angular velocity ωh, and in this case, the differential section 122 becomes unnecessary.

The converting section 130 has a characteristic of $-1/K_t$ obtained by inverting the sign of the reciprocal of the spring constant Kt of the torsion bar 2A, and converts the target steering torque Tref into a target torsional angle Δθref.

Figure 9:
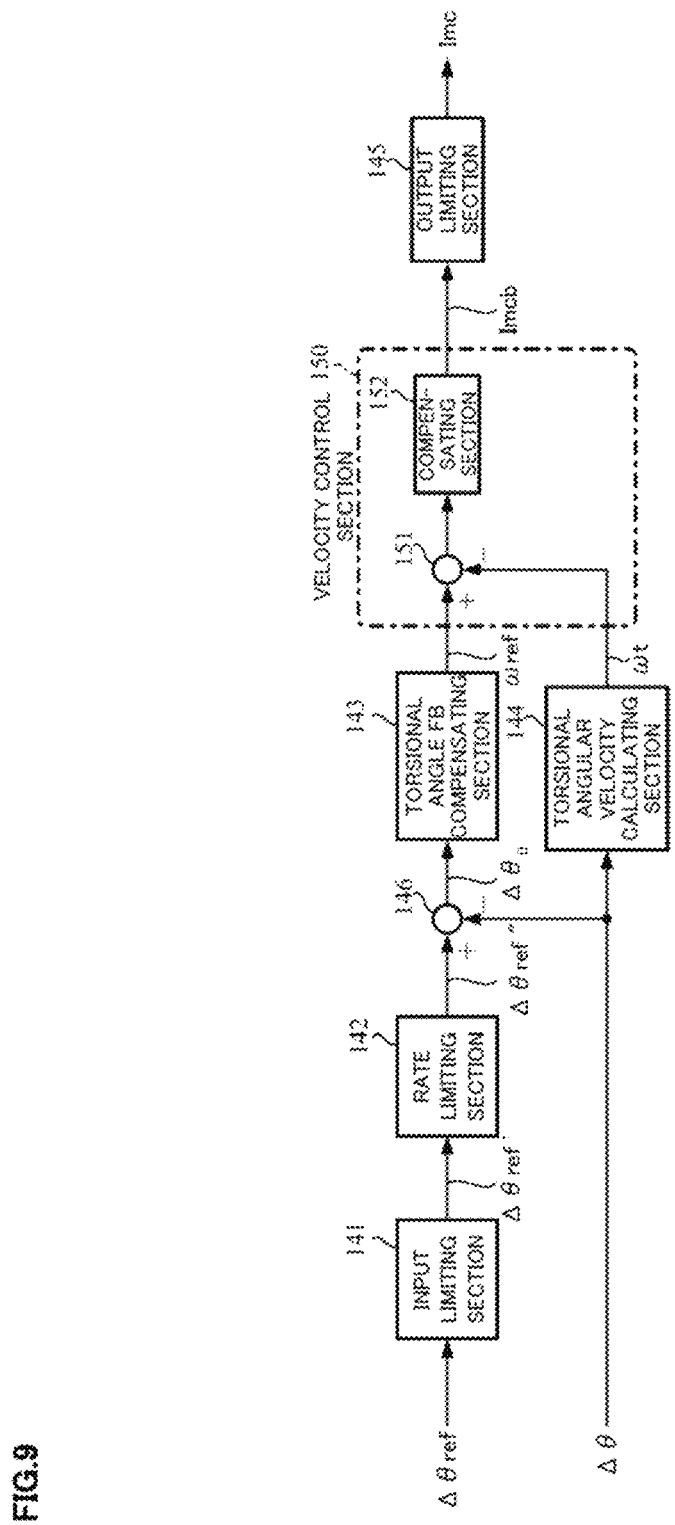
FIG. 9 is a block diagram showing a configuration example (the first embodiment) of a torsional angle control section.

The torsional angle control section 140 calculates the motor current command value Imc based on the target torsional angle 66 θref and the torsional angle Δθ. FIG. 9 is a block diagram showing a configuration example of the torsional angle control section 140. The torsional angle control section 140 comprises an input limiting section 141, a rate limiting section 142, a torsional angle feedback (FB) compensating section 143, a torsional angular velocity calculating section 144, a velocity control section 150, an output limiting section 145, and a subtracting section 146.

The input limiting section 141 limits upper and lower limit values of the target torsional angle Δθref so that the torsional angle control section 140 does not output the abnormal motor current command value Imc when the target torsional angle Δθref becomes an abnormal value in a communication, a calculation of a microcomputer or an ECU, and so on. The input limiting section 141 presets the upper limit value and the lower limit value with respect to the target torsional angle Δθref. In the case that the target torsional angle Δθref is larger than or equal to the upper limit value, the input limiting section 141 outputs the upper limit value as a target torsional angle Δθref'. In the case that the target torsional angle Δθref is smaller than or equal to the lower limit value, the input limiting section 141 outputs the lower limit value as the target torsional angle Δθref'. Otherwise, the input limiting section 141 outputs the target torsional angle Δθref, as it is, as the target torsional angle Δθref'. The set upper limit value and lower limit value may be the maximum value and the minimum value of a torsional angle used in the control respectively, and may be also the maximum value and the minimum value of a detectable torsional angle respectively. This enables security of safety.

The rate limiting section 142 limits a change amount of the target torsional angle Δθref' so that the value of the target torsional angle Δθref' does not change continuously and the target torsional angle Δθref' fluctuates discontinuously when the target torsional angle Δθref becomes an abnormal value. The target torsional angle normally changes continuously, and the rate limiting section 142 does not limit it. When the target torsional angle temporarily becomes an abnormal value by any abnormality, the discontinuous change is prevented by the limitation of the rate limiting section 142. For example, a difference between the present and the previous target torsional angles Δθref' is used as the change amount, when an absolute value of the change amount is larger than a predetermined value, addition or subtraction to the target torsional angle Δθref' is performed so that the absolute value of the change amount becomes the predetermined value, and the result is outputted as a target torsional angle Δθref". When the absolute value of the change amount is smaller than or equal to the predetermined value, the target torsional angle Δθref' is outputted, as it is, as the target torsional angle Δθref". The limitation may be performed such as by using a rate of the difference to the previous target torsional angle Δθref' as the change amount.

Although the input limiting section 141 and the rate limiting section 142 may be arranged reversely, the arrangement as shown in FIG. 9 is desirable. In such a case of dealing with the abnormal value and/or the discontinuous value by another method, it is possible to remove the input limiting section 141 and/or the rate limiting section 142.

The torsional angle FB compensating section 143 multiplies a deviation $\Delta\theta_0$, which is calculated at the subtracting section 146, between the target torsional angle Δθref" and the torsional angle Δθ by a compensation value $C_{FB}$ (a transfer function), and outputs a target torsional angular velocity ωref that enables followability of the torsional angle Δθ to the target torsional angle Δθref. The compensation value $C_{FB}$ may be simply a gain Kpp, or may be a compensation value generally used, such as a compensation value of PI-control. The target torsional angular velocity ωref is inputted into the velocity control section 150. By using the torsional angle FB compensating section 143 and the velocity control section 150, the torsional angle Δθ follows the target torsional angle Δθref, and it is possible to obtain the desired steering torque.

The torsional angular velocity calculating section 144 calculates a torsional angular velocity ωt by differential calculation to the torsional angle Δθ, and the torsional angular velocity ωt is inputted into the velocity control section 150. Pseudo-differential by an HPF and a gain may be performed as the differential calculation.

The velocity control section 150 calculates a motor current command value (a pre-limitation motor current command value) Imcb that enables followability of the torsional angular velocity ωt to the target torsional angular velocity ωref. The velocity control section 150 calculates a difference (ωref−ωt) between the target torsional angular velocity ωref and the torsional angular velocity ωt at a subtracting section 151, multiplies the difference by a compensation value Kv ata compensating section 152, and outputs the multiplied result as the motor current command value Imcb. Although a compensation value of proportional (P) compensation is used as the compensation value Kv, a compensation value of proportional integral (PI) compensation or the like may be used.

The output limiting section 145 limits upper and lower limit values of the motor current command value Imcb outputted from the velocity control section 150, and outputs the motor current command value Imc. As with the input limiting section 141, the output limiting section 145 performs the limitation by presetting the upper limit value and the lower limit value with respect to the motor current command value Imcb.

In such a configuration, an operating example of the present embodiment will be described with reference to flowcharts of FIGS. 10 to 12.

As the operation starts, the right-turning/left-turning judging section 110 inputs the motor angular velocity ωm, judges whether steering is right-turning or left-turning based on a sign of the motor angular velocity ωm, and outputs the judgment result as the steering state STs to the target steering torque generating section 120 (Step S10).

The target steering torque generating section 120 inputs the steering angle θh and the vehicle speed Vs with the steering state STs, and generates the target steering torque Tref (Step S20). An operating example of the target steering torque generating section 120 will be described with reference to a flowchart of FIG. 11.

The steering angle θh inputted into the target steering torque generating section 120 is inputted into the basic map section 121, the differential section 122 and the hysteresis correcting section 124, the steering state STs is inputted into the hysteresis correcting section 124, and the vehicle speed Vs is inputted into the basic map section 121 and the damper gain section 123 (Step S21).

The basic map section 121 generates the torque signal Tref_a corresponding to the steering angle θh and the vehicle speed Vs by using the basic map shown in FIG. 6A or 6B, and outputs it to the adding section 126 (Step S22).

The differential section 122 differentiates the steering angle θh, and outputs the steering angular velocity ωh (Step S23). The damper gain map 123 outputs the damper gain $D_G$ corresponding to the vehicle speed Vs by using the damper gain map shown in FIG. 7 (Step S24). The multiplying section 125 calculates the torque signal Tref_b by multiplying the steering angular velocity ωh and the damper gain $D_G$, and outputs it to the adding section 127 (Step S25).

The hysteresis correcting section 124 performs the hysteresis correction to the steering angle θh by switching the calculations of the expressions 3 and 4 depending on the steering state STs (Step S26), generates the torque signal Tref_c, and outputs it to the adding section 127 (Step S27). Although the hysteresis width $A_{hys}$, "a", x1 and y1 are preset and retained, it is possible to calculate "b" depending on steering directions (right-turning and left-turning) in advance, and retain "b" instead of x1 and y1.

The torque signals Tref_b and Tref_c are added at the adding section 127, the torque signal Tref_a is added to the added result at the adding section 126, and the target steering torque Tref is calculated (Step S28).

The target steering torque Tref generated at the target steering torque generating section 120 is inputted into the converting section 130, and is converted into the target torsional angle Δθref at the converting section 130 (Step S30). The target torsional angle Δθref is inputted into the torsional angle control section 140.

The torsional angle control section 140 inputs the torsional angle Δθ with the target torsional angle Δθref, and calculates the motor current command value Imc (Step S40).

An operating example of the torsional angle control section 140 will be described with reference to a flowchart of FIG. 12.

The target torsional angle Δθref inputted into the torsional angle control section 140 is inputted into the input limiting section 141, and the torsional angle Δθ is inputted into the torsional angular velocity calculating section 144 and the subtracting section 146 (Step S41).

The input limiting section 141 limits the upper and lower limit values of the target torsional angle Δθref by the preset upper limit value and lower limit value, and outputs the limited result as the target torsional angle Δθref' to the rate limiting section 142 (Step S42). The rate limiting section 142 limits the change amount of the target torsional angle Δθref', and outputs the limited result as the target torsional angle Δθref" to the subtracting section 146 (Step S43).

The deviation $\Delta\theta_0$ is calculated at the subtracting section 146 by subtracting the torsional angle Δθ from the target torsional angle Δθref" (Step S44). The deviation $\Delta\theta_0$ is inputted into the torsional angle FB compensating section 143. The torsional angle FB compensating section 143 compensates the deviation $\Delta\theta_0$ by multiplying the deviation $\Delta\theta_0$ by the compensation value $C_{FB}$ (Step S45), and outputs the target torsional angular velocity ωref to the velocity control section 150.

The torsional angular velocity calculating section 144 inputting the torsional angle Δθ calculates the torsional angular velocity ωt by the differential calculation to the torsional angle Δθ (Step S46), and outputs it to the velocity control section 150.

In the velocity control section 150, the difference between the target torsional angular velocity ωref and the torsional angular velocity ωt is calculated at the subtracting section 151, the proportional processing by the compensation value Kv is performed to the difference at the compensating section 152, and the result of the proportional processing is outputted as the motor current command value Imcb to the output limiting section 145 (Step S47).

The output limiting section 145 limits the upper and lower limit values of the motor current command value Imcb by the preset upper limit value and lower limit value (Step S48), and outputs the limited result as the motor current command value Imc (Step S49).

Current control is performed by driving the motor based on the motor current command value Imc outputted from the torsional angle control section 140 (Step S50).

Figure 10:
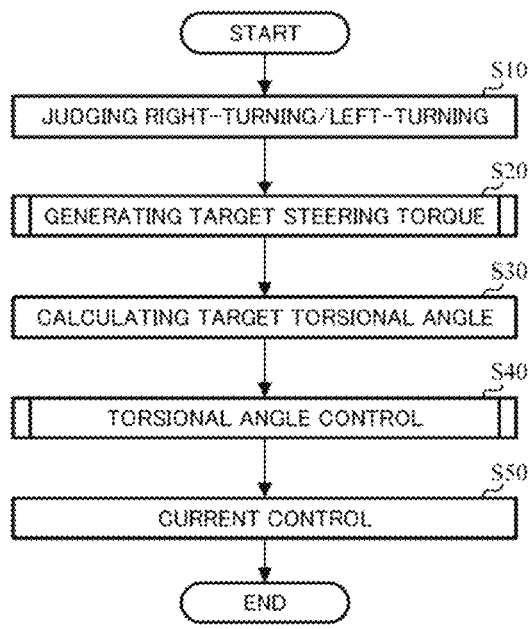
FIG. 10 is a flowchart showing an operating example of the present invention.
Figure 11:
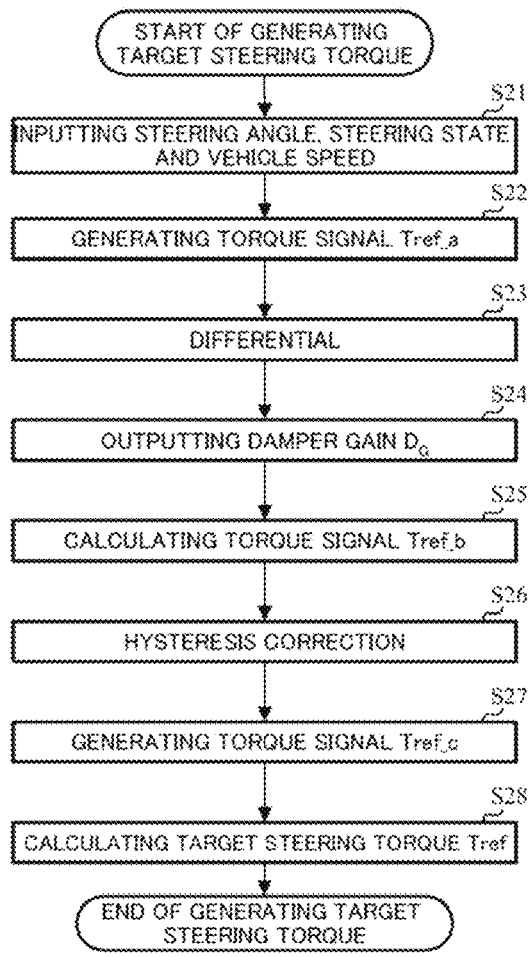
FIG. 11 is a flowchart showing an operating example of the target steering torque generating section.
Figure 12:
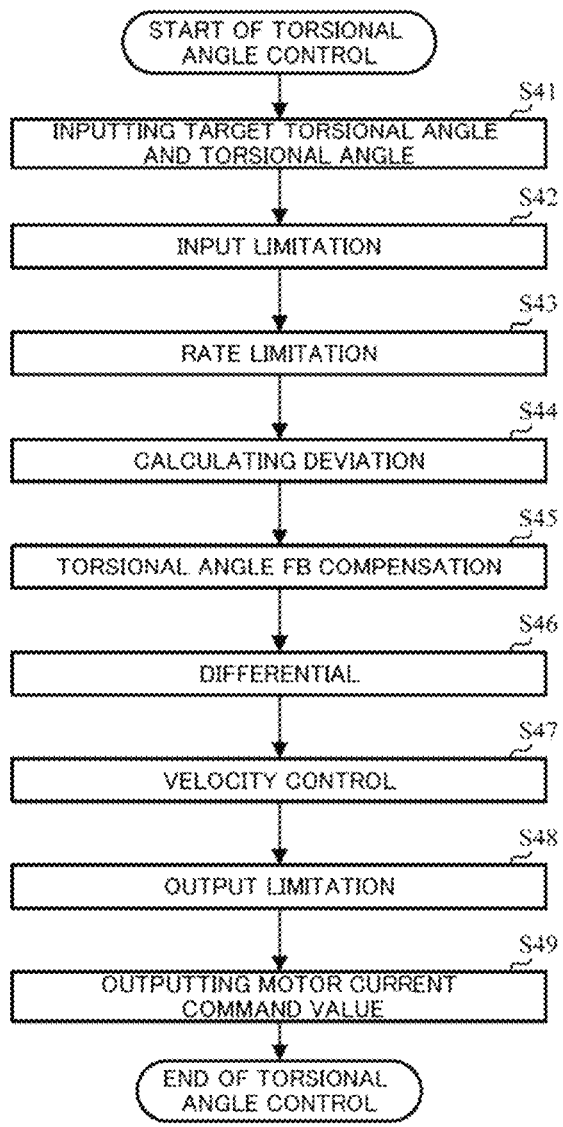
FIG. 12 is a flowchart showing an operating example (the first embodiment) of the torsional angle control section.

Each Order of the data inputs, the calculations, or the like in FIGS. 10 to 12 is appropriately changeable.

An effect of the followability to the target steering torque by the present embodiment will be described based on a simulation result.

Figure 13:
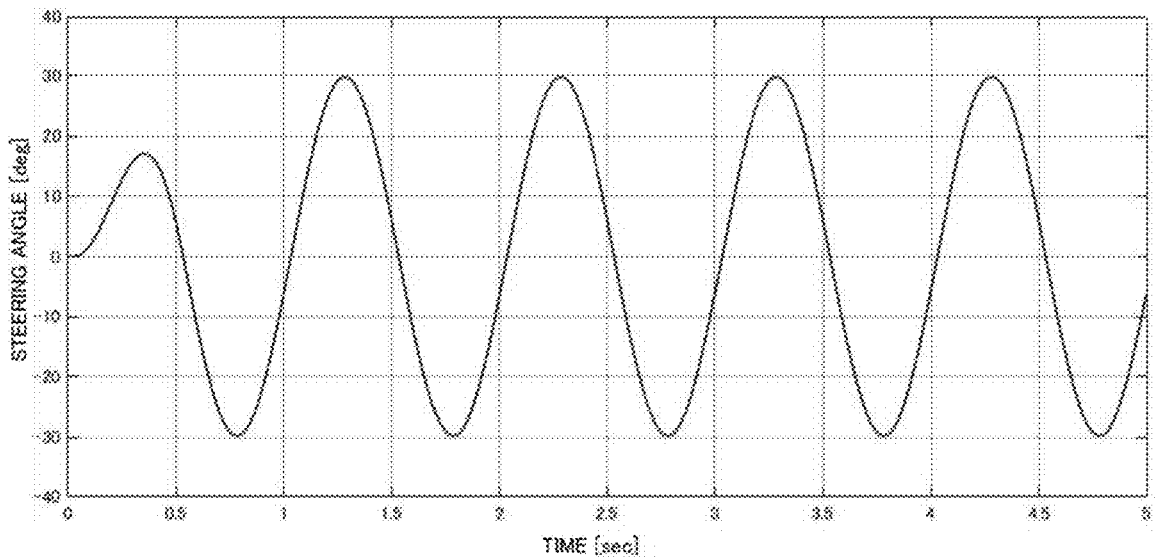
FIG. 13 is a graph showing a time sequence example of a steering angle used in a simulation.

First, a simulation result in the case of performing only a conventional assist control will be shown. Assuming ordinary steering, as shown in FIG. 13, a simulation of responses of the steering angle θh and the steering torque (the torsion bar torque) Tt in the case of changing the steering angle θh in a sine wave shape whose amplitude is about 30 deg and whose frequency is about 1.0 Hz, is performed. In FIG. 13, a horizontal axis shows a time [sec], and a vertical axis shows a steering angle [deg].

Figure 14:
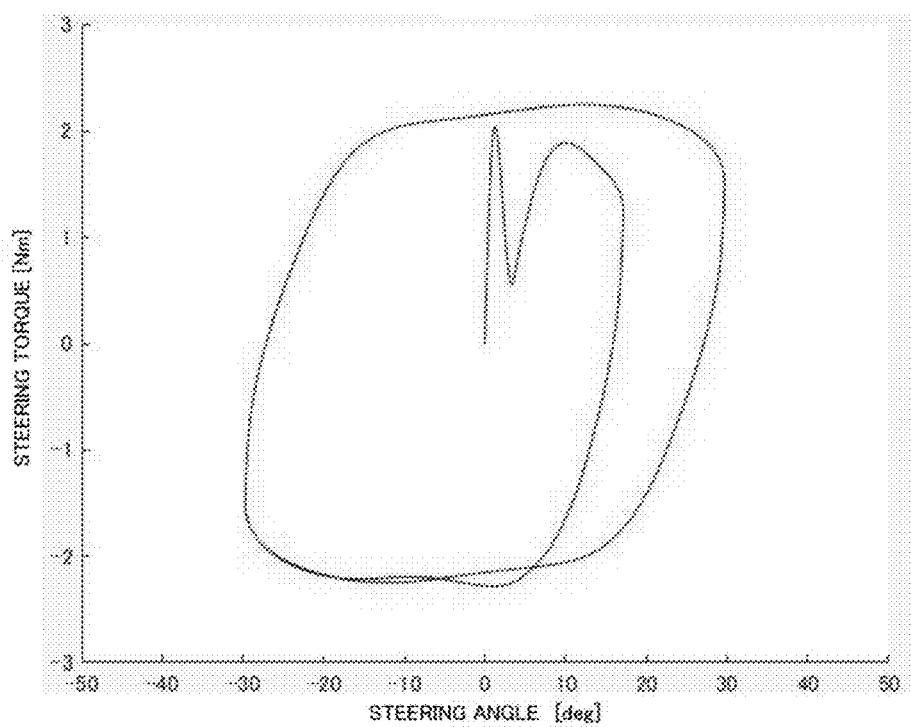
FIG. 14 is a simulation result in the case of not performing torsional angle control.

A time sequence waveform of the simulation result is shown in FIG. 14. In FIG. 14, a horizontal axis shows a steering angle [deg], a vertical axis shows a steering torque [N·m], and signs of them are adjusted so that when the steering angle is positive, the steering torque is also positive. Since a target steering torque does not exist in the assist control, in the case of performing only the assist control, the steering torque has a characteristic where the steering torque remains outputted continuously.

Next, a simulation result in the case of performing the torsional angle control will be shown. In the torsional angle control, the compensation values of the torsional angle FB compensating section 143 and the compensating section 152 in the velocity control section 150 are set to a proportional gain, and the torsional angular velocity calculating section 144 has a structure of an HPF where a cutoff frequency is 50 Hz and a transfer function is expressed by the following expression 5 ($T_{hpf}$ is a time constant of a filter).

$$\frac{s}{T_{hpf}s + 1} \quad \text{[Expression 5]}$$

Figure 15:
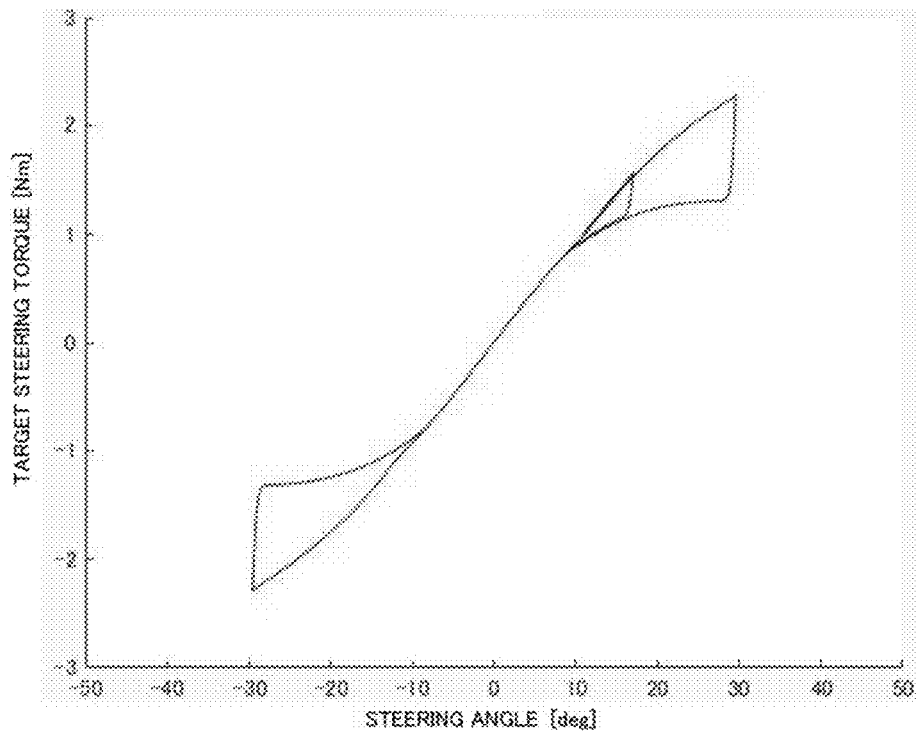
FIG. 15 is a diagram showing an output example of a target steering torque in a simulation in the case of performing the torsional angle control.

As with the case of performing only the assist control, an inputted steering angle θh is data of the sine wave shape as shown in FIG. 13. In this case, the target steering torque Tref outputted from the target steering torque generating section 120 becomes a waveform shown in FIG. 15. In FIG. 15, a horizontal axis shows a steering angle [deg], and a vertical axis shows a target steering torque [N·m].

Figure 16:
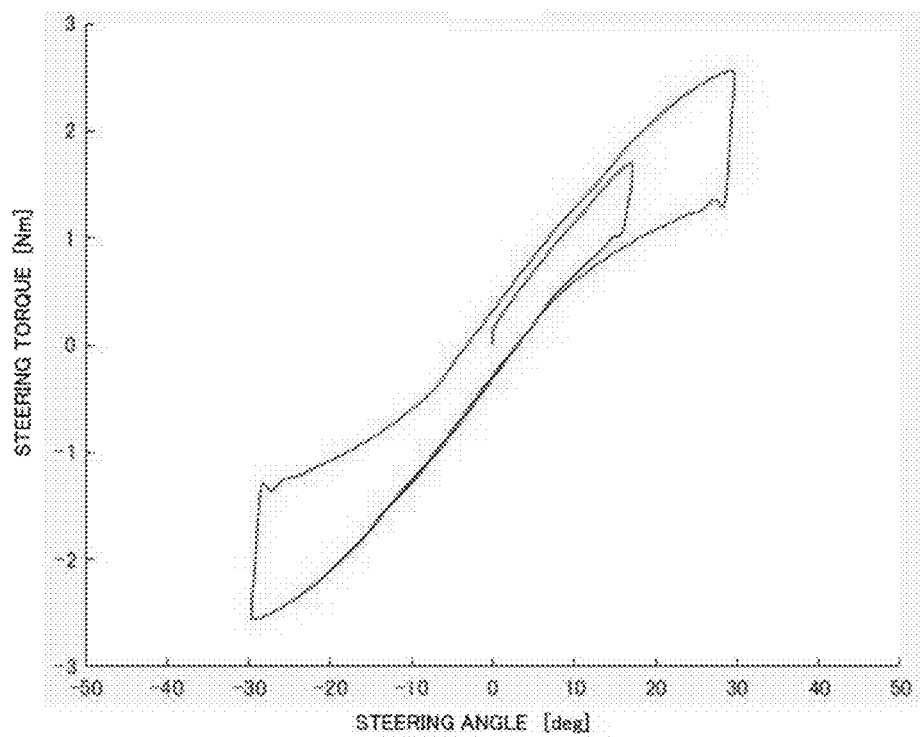
FIG. 16 is a simulation result in the case of performing the torsional angle control.

FIG. 16 shows a simulation result. In FIG. 16, a horizontal axis shows a steering angle [deg], a vertical axis shows a steering torque [N·m], and as with FIG. 14, signs of them are adjusted so that when the steering angle is positive, the steering torque is also positive. From FIGS. 15 and 16, it is found out that the steering torque follows the target steering torque comparatively well in the whole region.

Another configuration example of the present invention will be described.

Figure 17:
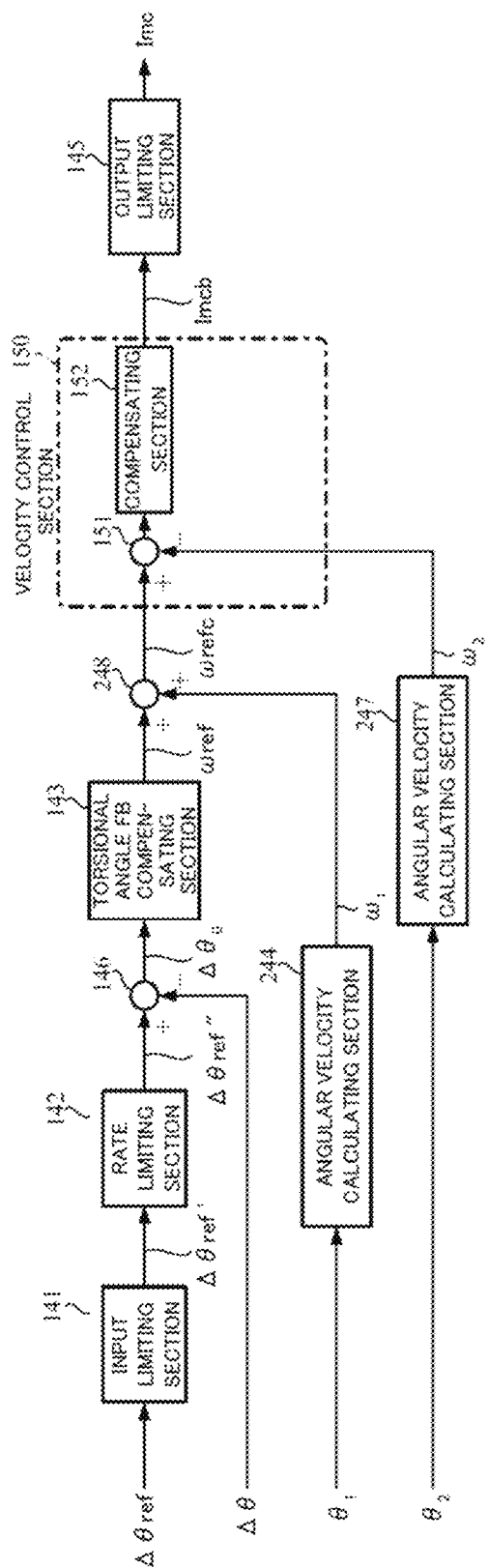
FIG. 17 is a block diagram showing a configuration example (a second embodiment) of a torsional angle control section.

Since the torsional angle Δθ of the torsion bar 2A can be replaced with the deviation between the steering wheel angle $\theta_1$ and the column angle $\theta_2$ as shown by expression 1, the torsional angle control section 140 of the first embodiment shown in FIG. 9 can be equivalently replaced with a configuration example (a second embodiment) shown in FIG. 17 as an effect that the first embodiment has remains as it is.

Compared with the torsional angle control section 140 of the first embodiment, in a torsional angle control section 240 of the second embodiment, the steering wheel angle (a first rotation angle) $\theta_1$ and the column angle (a second rotation angle) $\theta_2$ are inputted in addition to the target torsional angle Δθref and the torsional angle Δθ, angular velocity calculating sections 244 and 247 for the steering wheel angle $\theta_1$ and the column angle $\theta_2$ respectively are added instead of the torsional angular velocity calculating section 144 for the torsional angle Δθ, and an adding section 248 is further added. By setting what is obtained by adding a steering wheel angular velocity (a first angular velocity) $\omega_1$ calculated by differentiating the steering wheel angle $\theta_1$ to the target torsional angular velocity ωref to a target angular velocity ωrefc, it is possible to regard the velocity control section 150 as a configuration of velocity control with respect to a column angular velocity (a second angular velocity).

Compared with the first embodiment, an operating example of the second embodiment is different in only the operation of the torsional angle control section, and other operations are the same.

Figure 18:
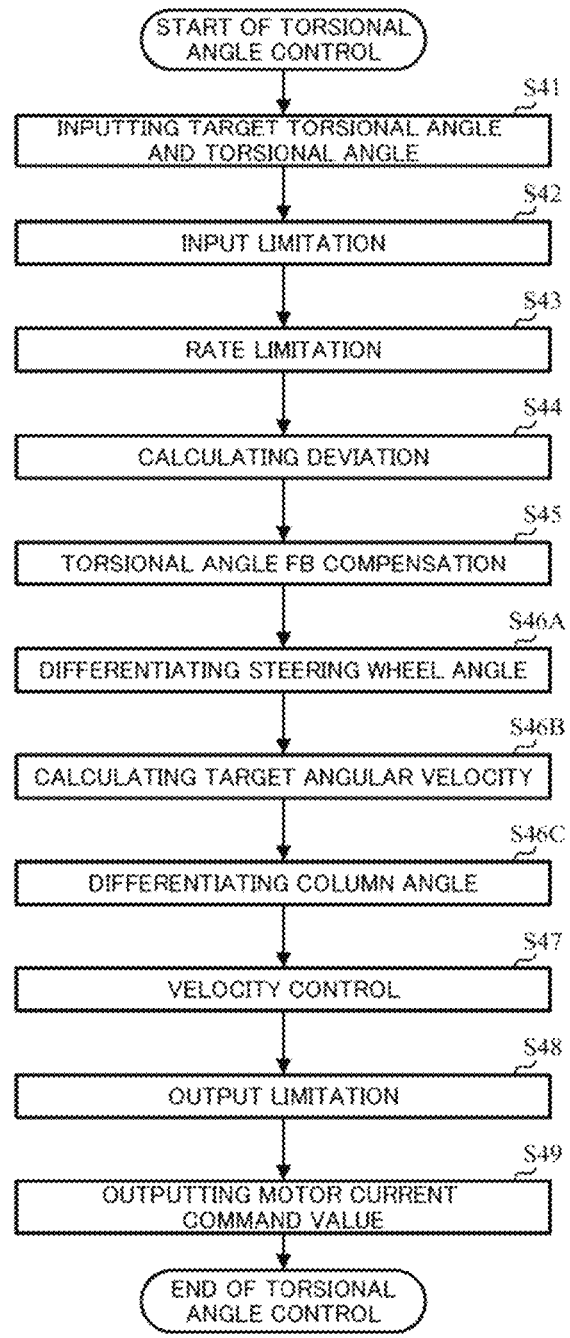
FIG. 18 is a flowchart showing an operating example (the second embodiment) of the torsional angle control section.

An operating example of the torsional angle control section in the second embodiment is shown by a flowchart of FIG. 18. Operations from the start to step S45 of performing the torsional angle FB compensation are the same as those of the first embodiment, and the target torsional angular velocity ωref outputted from the torsional angle FB compensating section 143 is inputted into the adding section 248. The angular velocity calculating section 244 inputting the steering wheel angle $\theta_1$ calculates the steering wheel angular velocity $\omega_1$ by differential calculation (Step S46A). The target torsional angular velocity ωref is added to the steering wheel angular velocity $\omega_1$ at the adding section 248, and the added result is outputted to the velocity control section 150 as the target angular velocity ωrefc (Step S46B). The angular velocity calculating section 247 inputting the column angle $\theta_2$ calculates the column angular velocity $\omega_2$ by differential calculation (Step S46C), and outputs it to the velocity control section 150. The velocity control section 150 performs the velocity control based on the target angular velocity ωrefc and the column angular velocity $\omega_2$ (Step S47). Operations after that are the same as those of the first embodiment.

Figure 19:
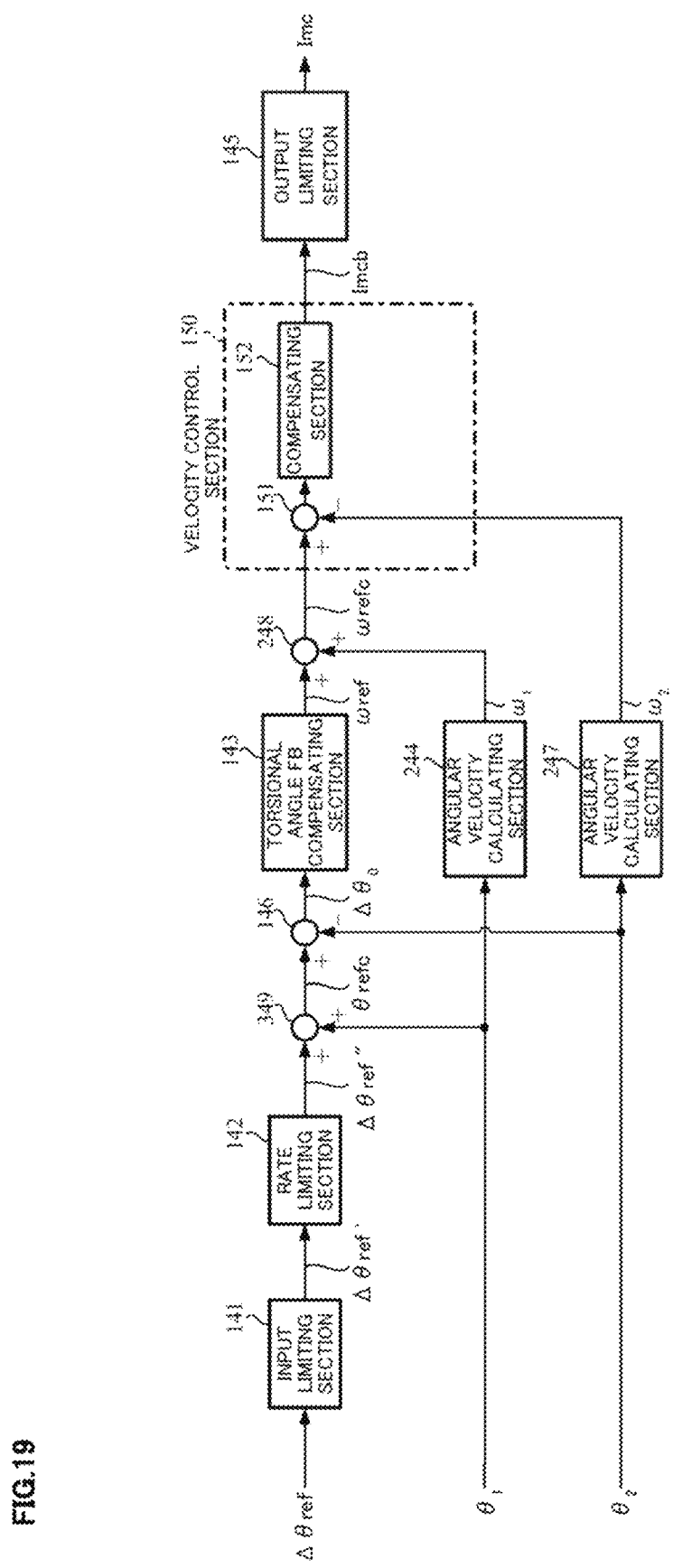
FIG. 19 is a block diagram showing a configuration example (a third embodiment) of a torsional angle control section.

By replacing the torsional angle Δθ with the deviation between the steering wheel angle $\theta_1$ and the column angle $\theta_2$, besides the second embodiment, the torsional angle control section 140 can be equivalently replaced with a configuration example (a third embodiment) shown in FIG. 19 as the effect that the first embodiment has remains as it is.

Compared with the torsional angle control section of the second embodiment, in a torsional angle control section of the third embodiment, the torsional angle Δθ is not inputted, and an adding section 349 is added. By setting what is obtained by adding the steering wheel angle $\theta_1$ to the target torsional angle Δθref" to a target rotation angle θrefc, multiplying the deviation $\Delta\theta_0$ between the target rotation angle θrefc and the column angle $\theta_2$ by the compensation value $C_{FB}$, and setting what is obtained by adding the steering wheel angular velocity $\omega_1$ to the multiplied result to the target angular velocity ωrefc, as with the second embodiment, it is possible to regard the velocity control section 150 as a configuration of velocity control with respect to a column angular velocity.

Compared with the second embodiment, an operating example of the third embodiment is different in only the operation of the torsional angle control section, and other operations are the same.

Figure 20:
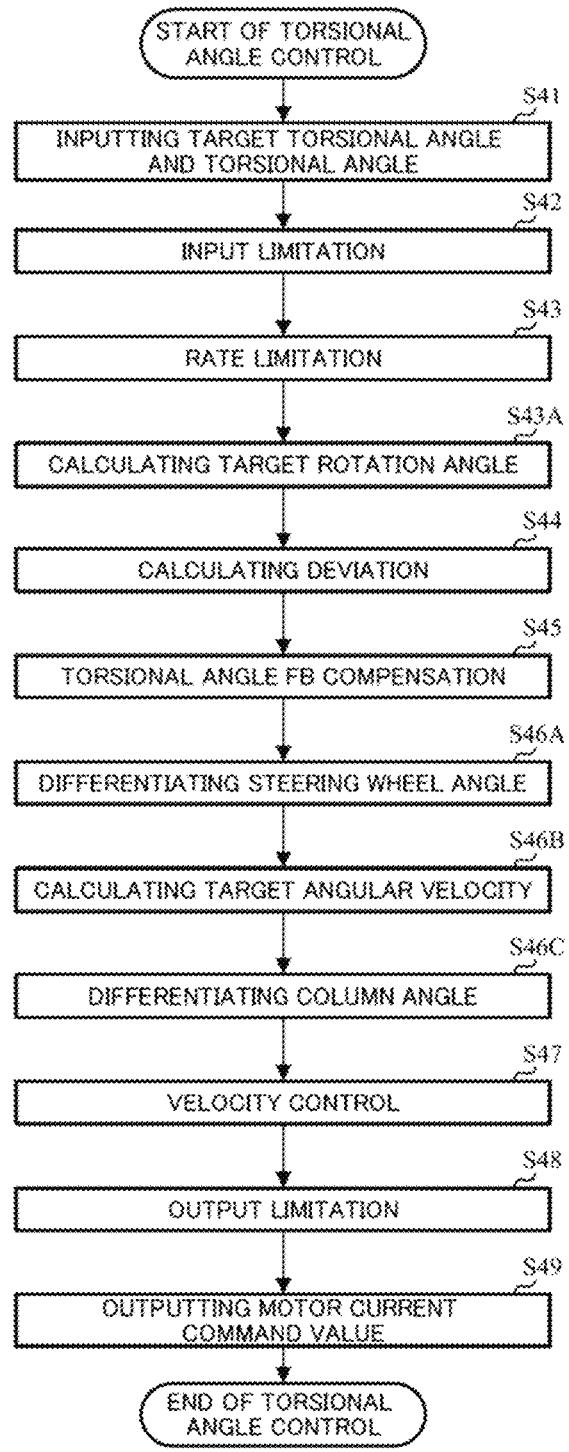
FIG. 20 is a flowchart showing an operating example (the third embodiment) of the torsional angle control section.

An operating example of the torsional angle control section in the third embodiment is shown by a flowchart of FIG. 20. Operations from the start to step S43 of performing the rate limitation are the same as those of the second embodiment, and the target torsional angle Δθref" outputted from the rate limiting section 142 is inputted into the adding section 349. The steering wheel angle $\theta_1$ is also inputted into the adding section 349, and the result of adding target torsional angle Δθref" and the steering wheel angle $\theta_1$ is outputted as the target rotation angle θrefc (Step S43A). The column angle $\theta_2$ is subtracted from the target rotation angle θrefc at the subtracting section 146, and the deviation $\Delta\theta_0$ is calculated (Step S44). Operations after that are the same as those of the second embodiment.

In the second and the third embodiments, by simply making a reduction mechanism perform reduction ratio transformation, data obtained by dividing a motor angular velocity by a reduction ratio may be used as the column angular velocity $\omega_2$. In this case, the angular velocity calculating section 247 becomes unnecessary. Further, the steering angle θh may be used instead of the steering wheel angle $\theta_1$.

Figure 2:
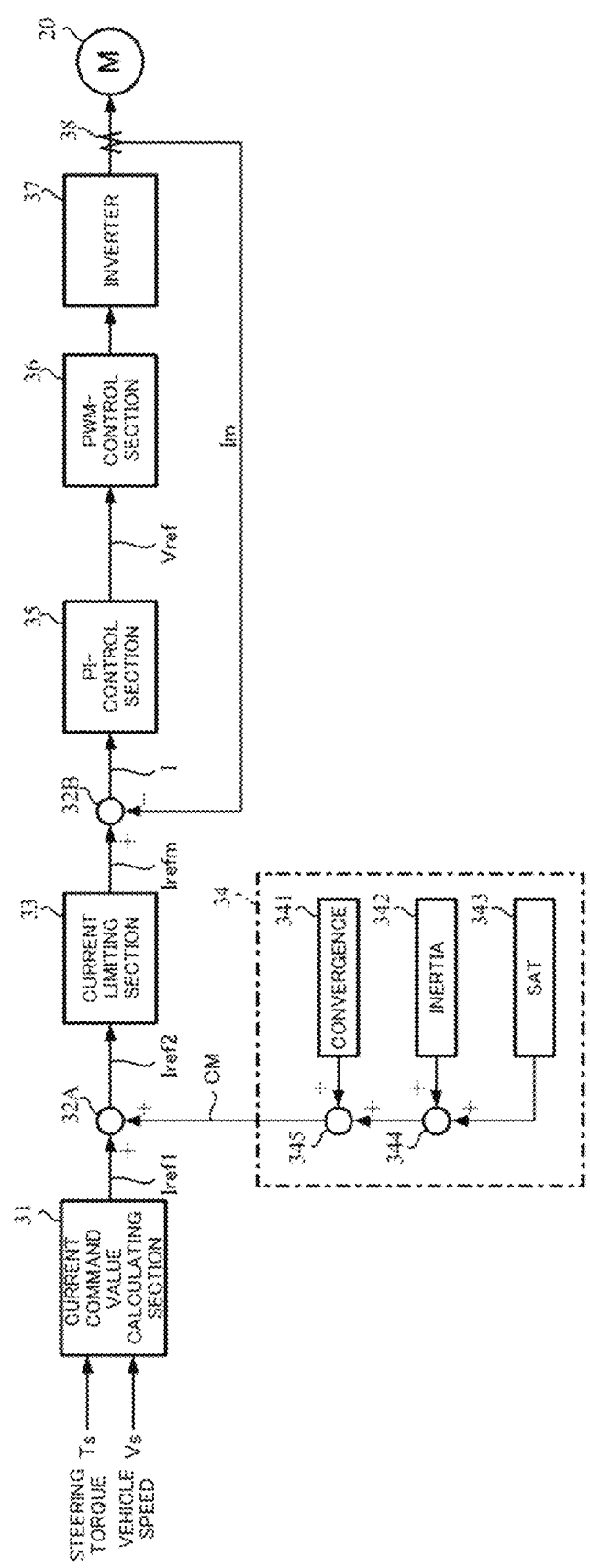
FIG. 2 is a block diagram showing a configuration example of a control unit (ECU) of the electric power steering apparatus.

Even when a current command value (an assist current command value) calculated based on a steering torque in a conventional EPS, for example, a current command value Iref1 outputted from a current command value calculating section 31 or a current command value Iref2 obtained by adding a compensation signal CM to the current command value Iref1 in FIG. 2, is added to the motor current command value Imc outputted from the torsional angle control section in the first to the third embodiments, it is possible to obtain the desired steering torque.

Figure 21:
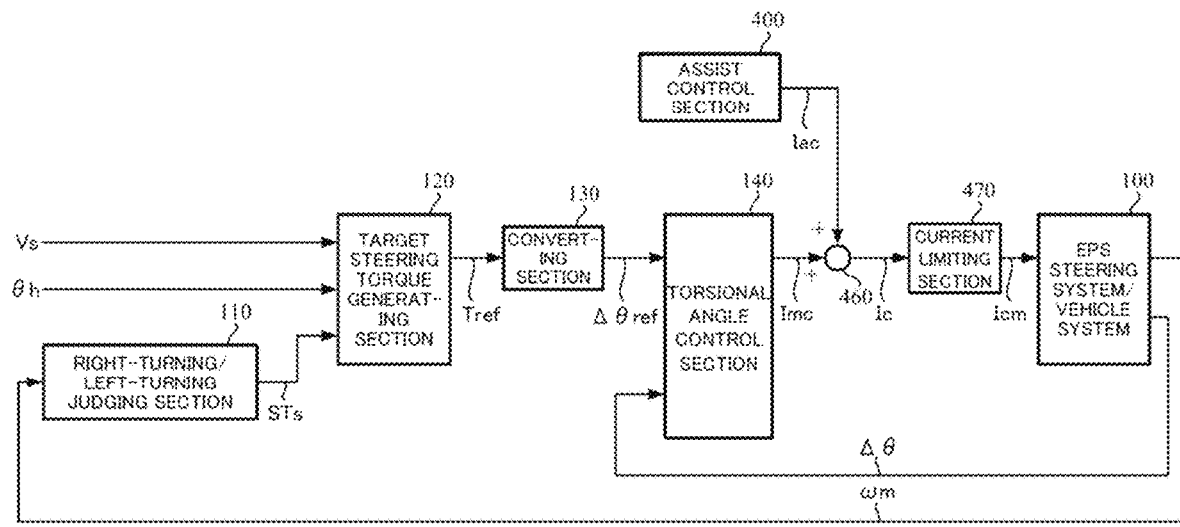
FIG. 21 is a block diagram showing a configuration example (a fourth embodiment) of the present invention.

A configuration example (a fourth embodiment) of applying the above to the first embodiment is shown in FIG. 21. An assist control section 400 is constituted by the current command value calculating section 31, or the current command value calculating section 31, a compensation signal generating section 34 and an adding section 32A. An assist current command value Iac (corresponding to the current command value Iref1 or Iref2 in FIG. 2) outputted from the assist control section 400 and the motor current command value Imc outputted from the torsional angle control section 140 are added at an adding section 460, a current command value Ic of the added result is inputted into a current limiting section 470, a motor is driven based on a current command value Icm whose maximum current is limited, and the current control is performed.

Figure 22A:
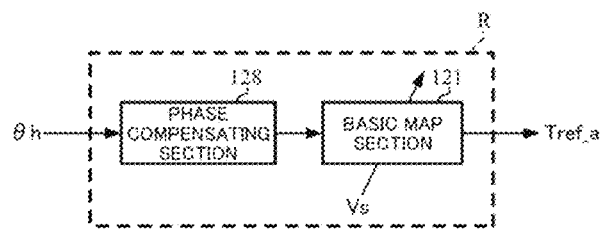
FIGS. 22A and 22B are block diagrams showing an inserting example of a phase compensating section.
Figure 22B:
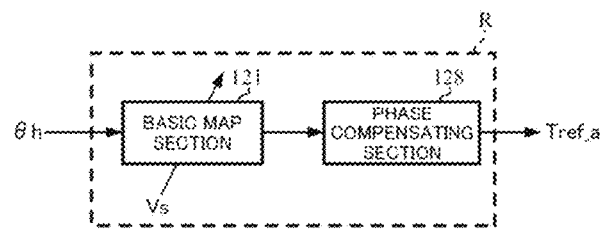

With respect to the target steering torque generating section 120 in the above embodiments (the first to the fourth embodiments), in such a case of focusing on a cost and a processing time, it is possible to omit the damper calculating section and/or the hysteresis correcting section 124. In the case of omitting the damper calculating section, the differential section 122 and the adding section 127 can be also omitted. In the case of omitting the hysteresis correcting section 124, the right-turning/left-turning judging section 110 and the adding section 127 can be also omitted. Further, it is possible to insert a phase compensating section 128 performing phase compensation into a front stage or a rear stage of the basic map section 121. That is, it is possible to change a configuration of an area "R" surrounded by a broken line in FIG. 5 to a configuration shown in FIG. 22A or 22B. In the case of setting phase advance compensation as the phase compensation in the phase compensating section 128, and, for example, performing the phase advance compensation by a primary filter where a cutoff frequency of a numerator is set to 1.0 Hz and a cutoff frequency of a denominator is set to 1.3 Hz, it is possible to achieve comfortable feeling. With respect to the target steering torque generating section, if it is configured based on the vehicle driving information, the configuration is not limited to the above configurations.

Figure 1:
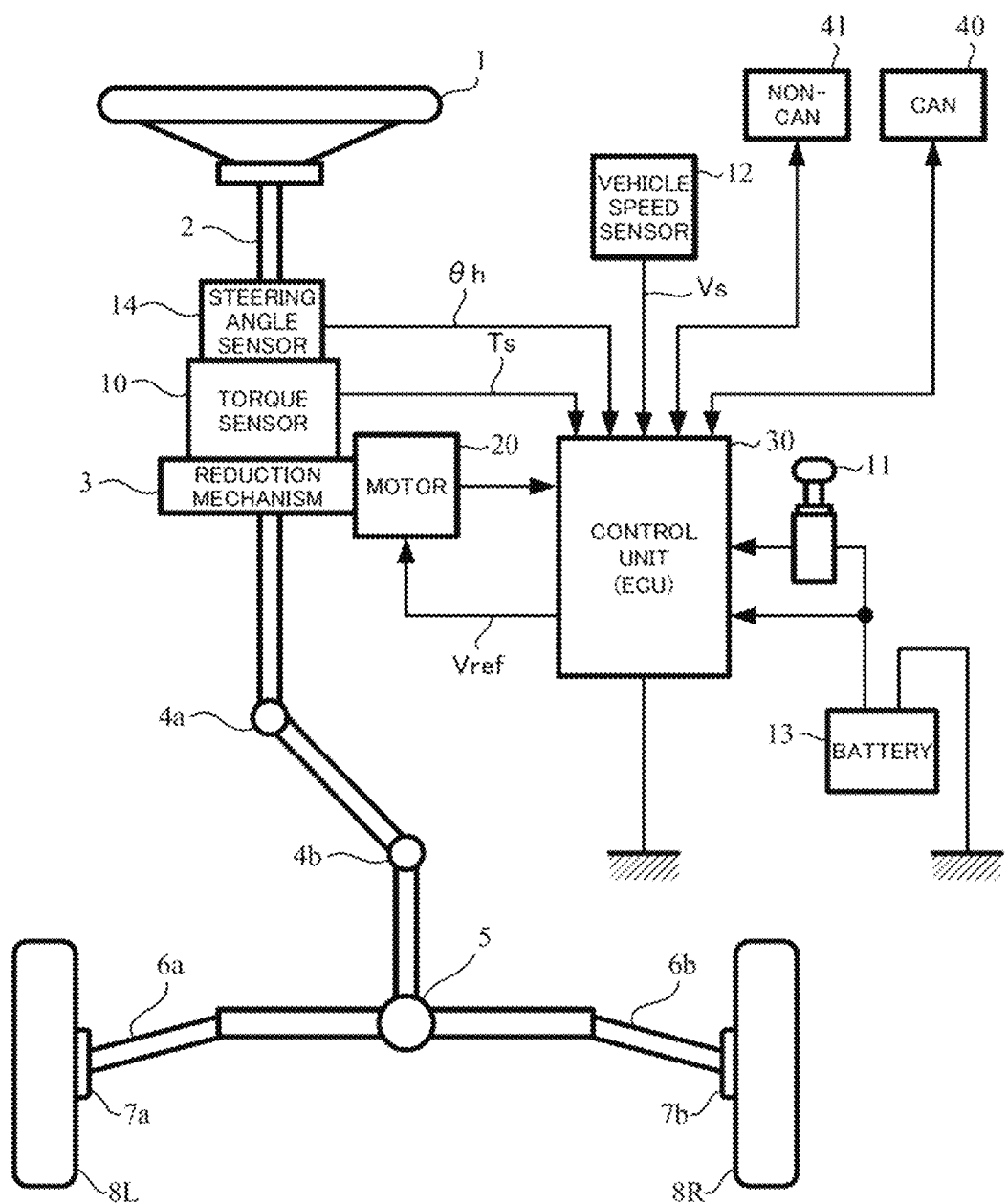
FIG. 1 is a configuration diagram illustrating a general outline of an electric power steering apparatus.

Although the present invention is applied to a column-type EPS in FIGS. 1 and 3, the present invention is not limited to an upstream-type EPS such as the column-type EPS, and can also be applied to a downstream-type EPS such as a rack-and-pinion type EPS. Further, in a viewpoint that the feedback control is performed based on the target torsional angle, the present invention can be applied to a steer-by-wire reaction force apparatus which comprises at least a torsion bar whose spring constant is arbitrary and a sensor for detecting the torsional angle, and so on.

EXPLANATION OF REFERENCE NUMERALS 1 steering wheel
2 column shaft (steering shaft, handle shaft)
2A torsion bar
3 reduction mechanism
10 torque sensor
12 vehicle speed sensor 14 steering angle sensor
20 motor
30 control unit (ECU)
31 current command value calculating section
33, 470 current limiting section
34 compensation signal generating section
100 EPS steering system/vehicle system
110 right-turning/left-turning judging section
120 target steering torque generating section
121 basic map section
123 damper gain section
124 hysteresis correcting section
128 phase compensating section
130 converting section
140 torsional angle control section
141 input limiting section
142 rate limiting section
143 torsional angle feedback (FB) compensating section
144 torsional angular velocity calculating section
145 output limiting section
150 velocity control section
152 compensating section
244, 247 angular velocity calculating section
400 assist control section

The invention claimed is:

1. A steering apparatus for vehicles that comprises at least a torsion bar having an arbitrary spring constant and a sensor detecting a torsional angle, drives and controls a motor, and assists and controls a steering system, comprising:
a target steering torque generating section that comprises a basic map section that obtains a first torque signal in accordance with vehicle driving information by using a basic map being vehicle speed sensitive, and a damper calculating section that obtains a second torque signal based on angular velocity information by using a damper gain map being vehicle speed sensitive, and calculates a target steering torque by said first torque signal and said second torque signal;
a converting section that converts said target steering torque into a target torsional angle; and
a torsional angle control section that calculates a motor current command value based on said target torsional angle and said torsional angle;
wherein said torsional angle control section comprises
a torsional angle feedback compensating section that calculates a target torsional angular velocity by a deviation between said target torsional angle and said torsional angle,
a torsional angular velocity calculating section that calculates a torsional angular velocity by said torsional angle,
a velocity control section that calculates a pre-limitation motor current command value by performing proportional compensation based on said target torsional angular velocity and said torsional angular velocity, and
an output limiting section that limits upper and lower limit values of said pre-limitation motor current command value, and outputs said motor current command value; and
wherein said steering apparatus for vehicles drives and controls said motor based on said motor current command value.

2. The steering apparatus for vehicles according to claim 1,
wherein said torsional angle control section further comprises an input limiting section that limits upper and lower limit values of said target torsional angle.

3. The steering apparatus for vehicles according to claim 1,
wherein said torsional angle control section further comprises a rate limiting section that limits a change amount of said target torsional angle.

4. The steering apparatus for vehicles according to claim 2,
wherein said torsional angle control section further comprises a rate limiting section that limits a change amount of said target torsional angle.

5. The steering apparatus for vehicles according to claim 1,
wherein said target steering torque generating section further comprises
a hysteresis correcting section that obtains a third torque signal by performing hysteresis correction to said vehicle driving information depending on a steering state, and
calculates said target steering torque by said first torque signal, said second torque signal and said third torque signal.

6. The steering apparatus for vehicles according to claim 1,
wherein said steering apparatus for vehicles drives and controls said motor based on a current command value that is obtained by adding an assist current command value calculated based on a steering torque to said motor current command value.

7. A steering apparatus for vehicles that comprises at least a torsion bar having an arbitrary spring constant and a sensor detecting a torsional angle, drives and controls a motor, and assists and controls a steering system, comprising:
a target steering torque generating section that comprises a basic map section that obtains a first torque signal in accordance with vehicle driving information by using a basic map being vehicle speed sensitive, and a damper calculating section that obtains a second torque signal based on angular velocity information by using a damper gain map being vehicle speed sensitive, and calculates a target steering torque by said first torque signal and said second torque signal;
a converting section that converts said target steering torque into a target torsional angle; and
a torsional angle control section that calculates a motor current command value based on said target torsional angle, said torsional angle, a first rotation angle and a second rotation angle;
wherein said torsional angle control section comprises
a torsional angle feedback compensating section that calculates a target torsional angular velocity by a deviation between said target torsional angle and said torsional angle,
a first angular velocity calculating section that calculates a first angular velocity by said first rotation angle,
a second angular velocity calculating section that calculates a second angular velocity by said second rotation angle,
a velocity control section that calculates a pre-limitation motor current command value by performing proportional compensation based on a target angular velocity that is obtained by said target torsional angular velocity and said first angular velocity, and said second angular velocity, and an output limiting section that limits upper and lower limit values of said pre-limitation motor current command value, and outputs said motor current command value; and wherein said steering apparatus for vehicles drives and controls said motor based on said motor current command value.

8. The steering apparatus for vehicles according to claim 7, wherein said torsional angle control section further comprises an input limiting section that limits upper and lower limit values of said target torsional angle.

9. The steering apparatus for vehicles according to claim 7, wherein said torsional angle control section further comprises a rate limiting section that limits a change amount of said target torsional angle.

10. The steering apparatus for vehicles according to claim 8, wherein said torsional angle control section further comprises a rate limiting section that limits a change amount of said target torsional angle.

11. The steering apparatus for vehicles according to claim 7, wherein said target steering torque generating section further comprises a hysteresis correcting section that obtains a third torque signal by performing hysteresis correction to said vehicle driving information depending on a steering state, and calculates said target steering torque by said first torque signal, said second torque signal and said third torque signal.

12. The steering apparatus for vehicles according to claim 7, wherein said steering apparatus for vehicles drives and controls said motor based on a current command value that is obtained by adding an assist current command value calculated based on a steering torque to said motor current command value.

13. A steering apparatus for vehicles that comprises at least a torsion bar having an arbitrary spring constant and a sensor detecting a torsional angle, drives and controls a motor, and assists and controls a steering system, comprising:

a target steering torque generating section that comprises a basic map section that obtains a first torque signal in accordance with vehicle driving information by using a basic map being vehicle speed sensitive, and a damper calculating section that obtains a second torque signal based on angular velocity information by using a damper gain map being vehicle speed sensitive, and calculates a target steering torque by said first torque signal and said second torque signal;

a converting section that converts said target steering torque into a target torsional angle; and a torsional angle control section that calculates a motor current command value based on said target torsional angle, a first rotation angle and a second rotation angle;

wherein said torsional angle control section comprises a torsional angle feedback compensating section that calculates a target torsional angular velocity by a deviation between a target rotation angle that is obtained by said target torsional angle and said first rotation angle and said second rotation angle, a first angular velocity calculating section that calculates a first angular velocity by said first rotation angle, a second angular velocity calculating section that calculates a second angular velocity by said second rotation angle, a velocity control section that calculates a pre-limitation motor current command value by performing proportional compensation based on a target angular velocity that is obtained by said target torsional angular velocity and said first angular velocity, and said second angular velocity, and an output limiting section that limits upper and lower limit values of said pre-limitation motor current command value, and outputs said motor current command value; and wherein said steering apparatus for vehicles drives and controls said motor based on said motor current command value.

14. The steering apparatus for vehicles according to claim 13, wherein said torsional angle control section further comprises an input limiting section that limits upper and lower limit values of said target torsional angle.

15. The steering apparatus for vehicles according to claim 13, wherein said torsional angle control section further comprises a rate limiting section that limits a change amount of said target torsional angle.

16. The steering apparatus for vehicles according to claim 14, wherein said torsional angle control section further comprises a rate limiting section that limits a change amount of said target torsional angle.

17. The steering apparatus for vehicles according to claim 13, wherein said target steering torque generating section further comprises a hysteresis correcting section that obtains a third torque signal by performing hysteresis correction to said vehicle driving information depending on a steering state, and calculates said target steering torque by said first torque signal, said second torque signal and said third torque signal.

18. The steering apparatus for vehicles according to claim 13, wherein said steering apparatus for vehicles drives and controls said motor based on a current command value that is obtained by adding an assist current command value calculated based on a steering torque to said motor current command value.

* * * * *